United States Patent [19]

Kumins et al.

[11] 4,265,967

[45] May 5, 1981

[54] WATERPROOFING SHEET MATERIAL

[75] Inventors: Charles A. Kumins, Gates Mills; Milan L. Warford, Shaker Heights, both of Ohio

[73] Assignee: Tremco, Incorporated, Cleveland, Ohio

[21] Appl. No.: 88,403

[22] Filed: Oct. 26, 1979

Related U.S. Application Data

[60] Division of Ser. No. 887,292, Mar. 16, 1978, which is a continuation-in-part of Ser. No. 798,566, May 19, 1977, abandoned.

[51] Int. Cl.$^3$ .................. B32B 27/42; B32B 9/04; C08L 93/00
[52] U.S. Cl. .................. 428/332; 260/27 R; 260/31.8 M; 428/321; 428/437; 428/489; 428/497; 428/524
[58] Field of Search ............ 428/332, 321, 437, 440, 428/489, 524, 497; 260/24, 27 R, 31.8 M

[56] References Cited

U.S. PATENT DOCUMENTS

| 4,045,265 | 8/1977 | Tajima et al. | 428/489 X |
|---|---|---|---|
| 4,065,591 | 12/1977 | Gannon | 428/489 X |
| 4,120,847 | 10/1978 | Culbertson | 428/524 X |
| 4,122,054 | 10/1978 | Culbertson | 428/524 X |
| 4,138,390 | 2/1979 | Emmons et al. | 428/521 X |
| 4,180,620 | 12/1979 | Inskip | 428/524 |

Primary Examiner—Thomas J. Herbert, Jr.
Attorney, Agent, or Firm—James R. Lindsay

[57] ABSTRACT

A waterproofing sheet material useful for example as a free floating membrane or flashing material in roofing applications, a pond liner, or a gasketing material, composed of from about 15 wt. % to about 80 wt. % of an ingredient selected from the group consisting of:

(a) homopolymers of alkadienes and substituted alkadienes
(b) addition copolymers of alkadienes with unsaturated monomers
(c) homopolymers of alkenes and substituted alkenes selected from the group consisting of polyethylene, chlorosulfonated polyethylene and polyisobutylene
(d) resin acids and resin acid derivatives
(e) highly aromatic bituminous materials, and
(f) pine oil and from about 85 wt. % to about 20 wt. % of a plasticized polyvinyl butyral resin. Minor amounts of fatty acids and paraffin wax may be added to improve low temperature properties and to facilitate processing a hot melt admixture of the ingredients into a sheet.

6 Claims, No Drawings

WATERPROOFING SHEET MATERIAL

This application is a division of co-pending U.S. Application Ser. No. 887,292, filed Mar. 16, 1978, which in turn is a continuation-in-part of Application Ser. No. 798,566, filed May 19, 1977, now abandoned.

INTRODUCTION

The present invention relates generally to the construction art, and more particularly to a waterproofing sheet material for roofing and other applications where a weather resistant elastomeric sheet material finds utility. One particularly suitable application for the sheeting material of the present invention is as a waterproofing membrane in a so-called "free floating" roofing system. In such a system the roof is covered with an elastomeric waterproof sheet material without the use of any adhesives or other means for securing the sheet to the roof deck proper. The sheet material is generally secured to the roof only along the perimeter of the roof, and is kept from blowing off the roof by the weight of stones loosely applied. Thus, the sheet material can expand and contract in response to changes in weather and can readily accommodate itself to shifting of the underlying roof deck in response to settling of the building. Heretofore membranes composed primarily of polyvinyl chloride or neoprene have been used for this purpose.

BRIEF SUMMARY OF THE INVENTION

In accordance with the present invention there is provided a sheet material suitable for use as a waterproofing membrane in roofing and other structural applications, the sheet material having a thickness within the range of about 20 to about 90 mils, and being composed of from about 15–20 wt.% up to about 80 wt.% of an ingredient selected from the group consisting of:
(a) homopolymers of alkadienes and substituted alkadienes
(b) addition copolymers of alkadienes with unsaturated monomers
(c) homopolymers of alkenes and substituted alkenes selected from the group consisting of polyethylene, chlorosulfonated polyethylene and polyisobutylene
(d) resin acids and resin acid derivatives
(e) highly aromatic bituminous materials, and
(f) pine oil
and from about 80–85 wt.% down to about 20 wt.% of a plasticized polyvinyl butyral resin. Various common fatty acids such as linseed oil, soya oil, oleic acid and stearic acid, and mixtures thereof may be included in the composition in amounts within the range of about 2 wt.% to about 8 wt.% to improve low temperature characteristics and to assist in processing a hot melt admixture of the ingredients into a sheet. Small quantities of paraffin wax from about 2 wt.% to about 10 wt.% may also be added as a processing aid. If desired, pigments such as calcium carbonate and carbon black may be added in amounts within the range of about 12 wt.% to about 25 wt.%.

Waterproofing sheet material produced in accordance with the present invention have excellent properties of UV resistance, cohesion, elongation, tensile strength, low water absorption characteristics, satisfactory flexibility at low temperature, and good overall weather resistance.

It is therefore an object of the present invention to provide an improvement in waterproofing sheet materials.

A further object of the invention is to provide a waterproofing sheet material composed of an ingredient selected from the group consisting of:
(a) homopolymers of alkadienes and substituted alkadienes
(b) addition copolymers of alkadienes with unsaturated monomers
(c) homopolymers of alkenes and substituted alkenes selected from the group consisting of polyethylene, chlorosulfonated polyethylene and polyisobutylene
(d) resin acids and resin acid derivatives
(e) highly aromatic bituminous materials, and
(f) pine oil
and a plasticized polyvinyl butyral resin.

These and other objects and advantages of the invention will become apparent from the following detailed description which includes a disclosure of the best mode presently contemplated for practicing the invention.

DETAILED DESCRIPTION OF THE INVENTION

Waterproofing sheet material in accordance with the present invention which contain up to 60 wt.% polyvinyl butyral can be prepared by a "hot melt" process. This involves heating the other principal ingredient, to liquefaction if a solid, and while maintaining the said ingredient at a suitable elevated temperature, slowly adding with stirring the plasticized polyvinyl butyral resin. A heavy duty mixer fitted with a sigma blade is satisfactory for this purpose. The heating of the mixture with stirring is continued until the product appears to be homogeneous. Overheating, and unduly prolonged heating should be avoided as this tends to adversely affect the low temperature properties of the resultant sheet material.

Where additional ingredients such as fatty acids, paraffin wax, fillers of pigments are employed, these are added with stirring until uniformly distributed throughout the hot melt.

The sheet material may be prepared by extruding or calendaring the hot melt composition or by casting it onto a neoprene rubber substrate and drawing down the hot melt composition with a doctor blade to a controlled thickness within the range of abut 20 to about 90 mils, and preferably about 40 mils. The cast material is cooled in contact with the neoprene rubber substrate and then simply peeled away after solidification.

For continuous operation, an endless metal or neoprene rubber belt may be used. The belt should be of sufficient length to permit deposition of the hot melt and cooling to solidification on a single reach of the endless belt.

Formulations containing more than 60 wt.% polyvinyl butyral generally are too viscous to be processed by the above-described hot melt method. Further, they cannot be sheeted out by the above-described hot cast method.

In order to obtain homogeneous mixtures from these formulations high shear mixing is essential. This can be accomplished in a Banbury mixer without the application of external heat, although heating will shorten the mixing cycle. Alternatively, mixing may be accomplished in a sigma blade mixer by applying sufficient external heat to maintain the materials at a temperature within the range of about 200°–250° F. Liquid modifiers must be added incrementally so as not to unduly reduce the high shear necessary for intimate mixing of the materials.

Formulations containing more than 60 wt.% polyvinyl butyral, since they cannot be sheeted out by a hot cast method, must be processed into sheets using extrusion or calendaring techniques, which are well known in the art.

The invention also contemplates the preparation of sheet material reinforced with scrim, or woven glass fiber mat, or the like. The reinforcing can be incorporated as a facing, in which event it is placed on a substrate before the cast, extruded or calendared material is applied. Alternatively, the reinforcement can be incorporated as an interlayer by sandwiching it between separate pourings of cast material or separate extruded or calendared sheets.

Among the ingredients useful in the practice of the invention alone or in combinations, as adjuvants to plasticized polyvinyl butyral in forming a waterproofing sheet material are the following:

Homopolymers of alkadienes and substituted alkadienes—particularly the $C_4$ alkadienes—of which polybutadiene, polyisoprene (2-methyl-1,3-butadiene) and polychloroprene (2-chloro-1,3-butadiene) are representative examples.

Addition copolymers of alkadienes—particularly the $C_4$ alkadienes—with unsaturated monomers, of which polybutadiene-styrene, polybutadiene-acrylonitrile and polyisoprene-isobutylene are representative examples.

Homopolymers of alkenes and substituted alkenes selected from the group consisting of polyethylene, chlorosulfonated polyethylene and polyisobutylene.

The resin acids and resin acid derivatives. The former are the principal constituents in pine tar and rosins. Representative examples of the latter include the glycerol esters of hydrogenated rosins and hydrogenated methyl rosinate.

Highly aromatic bituminous materials, such as coal tar pitches and aromatic extracts of asphalt.

Coal tar pitches useful in the practice of the invention are those which have a softening point (ASTM D-36) within the range of about 100° F. to about 200° F., preferably within the range of about 120° F. to about 145° F.

A commercially available, highly aromatic extract of asphalt useful in the practice of the present invention, has the following typical properties:

| | |
|---|---|
| Softening Point (R&B) °F. | 100 ± 10 |
| Specific Gravity at 77° F. | 1.17 |
| Pounds per Gallon | 9.76 |
| Viscosity S.S.F. at 210° F. | 103 |
| Viscosity S.S.F. at 250° F. | 26 |
| Penetration at 77° F. (100 Gr. × 5 Sec.) | 38 |
| Aromatics, wt. % | 98 |
| Flash Point (C.O.C.) °F. | 490 |
| Distillation (D-1160) °F. I.B.P. | 700+ |

Finally, pine oil may be used as an adjuvant to plasticized polyvinyl butyral in forming a waterproofing sheet in accordance with the present invention.

Plasticized polyvinyl butyral resins useful in the practice of the invention are commercially available, and are widely used in sheet form as interfacing for safety glass for automotive and other applications. While virgin material is eminently suitable for use in the practice of the invention, it is quite expensive. Substantial volumes of scrap material generated by safety glass manufacturers is equally suitable and far less expensive.

In general, plasticized polyvinyl butyral resins are prepared by hydrolyzing polyvinyl acetate to polyvinyl alcohol, and then condensing the alcohol with butyraldehyde, in the presence of an acid catalyst. Since the reactions are not complete, the resin will contain generally less than 2 wt.% vinyl acetate, from about to 8 wt.% to about 22 wt.% vinyl alcohol, the remainder being vinyl butyral molecules.

After the resin has been dried, and stabilized by treatment with an alkaline material, it is mixed with a plasticizer in an amount ranging from about 10 wt.% to about 60 wt.%, and preferably about 20 wt.% to about 30 wt.%. Suitable plasticizers include triethylene glycol di-2-ethylbutyrate, diethylene glycol di-2-ethylbutyrate, dibutyl sebacate, and esters of di-or triethylene glycol with caprylic, lauric or other long chain acids.

For further details about the preparation of polyvinyl butyral resins, see Schildkenecht, *Vinyl and Related Polymers,* John Wiley & Sons, Inc., pp. 358–365 (1952).

A suitable commercially available polyvinyl butyral resin useful in the practice of the invention is sold under the trademark BUTACITE by E. I. Du Pont De Nemours & Co. This material is believed to comprise about 22.5 wt.% vinyl alcohol groups, is plasticized with about 31 wt.% of triethylene glycol di-2-ethylbutyrate plasticizer and has a molecular weight range of 60,000 to 70,000.

Commercially available unplasticized polyvinyl butyral resins, when plasticized, may also be used. Such resins are sold by Monsanto Polymers & Petrochemicals Co. under the trademark Butvar.

EXAMPLE 1

A composition containing 50 wt.% coal tar pitch having a softening point of about 120° F. and 50% plasticized polyvinyl butyral, was prepared by heating the coal tar pitch to a temperature within the range of about 350° to about 400° F. and slowly adding the plasticized polyvinyl butyral ingredient with stirring. During the addition, the temperature of the mixture was maintained between about 375° F. and about 400° F. The stirring was continued until the mixture appeared to be homogeneous. With the composition at its mixing temperature, it was formed into sheets by spreading the same on a neoprene rubber substrate. The thickness of the deposit was drawn down with a doctor blade to provide a predetermined thickness of deposit. After cooling, the deposited composition was peeled from the neoprene as a self-supporting sheet approximately 40 mils in thickness.

EXAMPLE 2

Example 1 was repeated except that the composition was changed to provide 65 wt.% coal tar pitch and 35 wt.% plasticized polyvinyl butyral.

EXAMPLE 3

Example 1 was repeated except that composition was adjusted to provide 80 wt.% coal tar pitch and 20 wt.% plasticized polyvinyl butyral.

EXAMPLE 4

Example 1 was repeated except that a 145° F. softening point (ASTM D-36) coal tar pitch was substituted.

EXAMPLES 5-7

Additional sheets of waterproofing material were prepared from the compositions listed in the table below, compositions which included processing and low temperature flexibilizing ingredients such as pine tar pitch, soya fatty acids and paraffin wax.

Certain physical properties of the resulting sheets were tested and the findings are also reported in the table below.

|  | 5 | 6 | 7 |
|---|---|---|---|
| Coal Tar Pitch, 120° S.P. (ASTM D-36) | 42.5 | 42.5 | — |
| Coal Tar Pitch, 145° S.P. (ASTM D-36) | — | — | 42.5 |
| Pine Tar Pitch | — | 7.5 | 7.5 |
| Soya Fatty Acids | 7.5 | — | — |
| Paraffin Wax | 7.5 | 7.5 | 7.5 |
| Polyvinylbutyral | 42.5 | 42.5 | 42.5 |
| Tensile Strength, psi | 832 | 1180 | 1624 |
| Elongation, % | 440 | 310 | 335 |
| Recovery, % | 93 | 96 | 93 |
| Tear Strength, psi ASTM 624 Die C | 72 | 92 | 83 |
| Flexibility at −15° F. Bend Over ⅜" Mandrel | OK | OK | OK |

The sheet formed from the composition set forth in Example 6 was further tested by exposing it to three weeks of water immersion and 1,000 hours in a weatherometer. The results are reported below:

|  | Tensile | Elongation |
|---|---|---|
| After three weeks water immersion | 1104 psi | 410% |
| After 1,000 hrs. in a weatherometer | 1000 psi | 250% |

EXAMPLES 8-21

Except where otherwise indicated, the following formulations were prepared from commercially available ingredients, using high shear mixing equipment, and sheeting having a thickness of about 60 mils was accomplished by calendaring.

| Example | Wt. % PVB | Other Ingredient(s) | Wt. % |
|---|---|---|---|
| 8 | 85 | pine oil | 15 |
| 9 | 85 | pine tar | 15 |
| 10 | 85 | chlorosulfonated polyethylene | 15 |
| 11 | 85 | polychloroprene | 15 |
| 12 | 85 | polybutadiene-styrene | 15 |
| 13 | 85 | glycerol ester of hydrogenated rosin | 15 |
| 14 | 85 | polyisobutylene | 15 |
| 15 | 85 | hydrogenated methyl rosinate | 15 |
| 16 | 85 | polybutadiene-acrylonitrile | 15 |
| 17 | 85 | polyethylene | 15 |
| 18 | 85 | polyisoprene-isobutylene copolymer | 15 |
| 19 | 85 | aromatic extract of asphalt** | 15 |
| 20* | 55 | aromatic extract of asphalt** soya fatty acid | 40 5 |
| 21* | 55 | 145 S.P. coal tar pitch soya fatty acid | 39 6 |

*formation prepared by hot melt mixing
**typical properties reported above

Specimens of the sheets formed were tested in accordance with ASTM D-412 for tensile strength and elongation following various pretreating conditions. The results are reported in the table below:

| | Tensile Strength and Elongation ASTM D-412 | | | |
|---|---|---|---|---|
| Example | Room Temperature | Water Immersion (2 wks) | 158° F. (2 wks) | Weatherometer (160 hrs) |
| 8 | 1797 psi @ 300% | 310 psi @ 400% | 3860 psi @ 300% | 1035 psi @ 350% |
| 9 | 3304 psi @ 350% | 696 psi @ 350% | 3580 psi @ 350% | 2090 psi @ 250% |
| 10 | 2500 psi @ 150% | 1046 psi @ 200% | 2275 psi @ 150% | 1617 psi @ 150% |
| 11 | 2567 psi @ 150% | 1048 psi @ 250% | 3105 psi @ 200% | 1297 psi @ 250% |
| 12 | 2327 psi @ 200% | 990 psi @ 250% | 2100 psi @ 200% | 1944 psi @ 200% |
| 13 | 3333 psi @ 300% | 361 psi @ 400% | 2970 psi @ 200% | 2618 psi @ 250% |
| 14 | 1850 psi @ 200% | 909 psi @ 400% | 2475 psi @ 250% | 1562 psi @ 300% |
| 15 | 2641 psi @ 300% | 832 psi @ 325% | 3312 psi @ 300% | 2492 psi @ 300% |
| 16 | 3149 psi @ 250% | 1536 psi @ 325% | 2978 psi @ 250% | 2667 psi @ 250% |
| 17 | 2079 psi @ 250% | 1482 psi @ 300% | 3536 psi @ 200% | 1692 psi @ 200% |
| 18 | 1568 psi @ 200% | 956 psi @ 300% | 950 psi @ 150% | 1297 psi @ 250% |
| 19 | 3380 psi @ 300% | 1794 psi @ 350% | 4000 psi @ 350% | 2375 psi @ 300% |
| 20 | 1375 psi @ 350% | 940 psi @ 400% | 1471 psi @ 350% | — |
| 21 | 1050 psi @ 350% | 820 psi @ 425% | 1362 psi @ 250% | — |

Specimens of the sheets formed were tested in accordance with ASTM-624 Die C for tear strength following various pretreating conditions. The results are reported in the table below:

| | Tear Strength ASTM-624 Die C | | | |
|---|---|---|---|---|
| Example | Room Temperature | Water Immersion (2 wks) | 158° F. (2 wks) | Weatherometer (160 hrs) |
| 8 | 131 lbs/in. | 47 lbs/in. | 263 lbs/in. | 85 lbs/in. |
| 9 | 221 lbs/in. | 51 lbs/in. | 224 lbs/in. | 152 lbs/in. |
| 10 | 317 lbs/in. | 124 lbs/in. | 320 lbs/in. | 267 lbs/in. |
| 11 | 250 lbs/in. | 95 lbs/in. | 342 lbs/in. | 261 lbs/in. |
| 12 | 278 lbs/in. | 82 lbs/in. | 304 lbs/in. | 240 lbs/in. |
| 13 | 217 lbs/in. | 47 lbs/in. | 305 lbs/in. | 162 lbs/in. |
| 14 | 281 lbs/in. | 78 lbs/in. | 257 lbs/in. | 273 lbs/in. |
| 15 | 193 lbs/in. | 54 lbs/in. | 173 lbs/in. | 138 lbs/in. |
| 16 | 321 lbs/in. | 63 lbs/in. | 330 lbs/in. | 284 lbs/in. |
| 17 | 336 lbs/in. | 112 lbs/in. | 346 lbs/in. | 322 lbs/in. |

-continued

| | Tear Strength ASTM-624 Die C | | | |
|---|---|---|---|---|
| Example | Room Temperature | Water Immersion (2 wks) | 158° F. (2 wks) | Weatherometer (160 hrs) |
| 18 | 246 lbs/in. | 158 lbs/in. | 224 lbs/in. | 253 lbs/in. |
| 19 | 317 lbs/in. | 175 lbs/in. | 265 lbs/in. | 213 lbs/in. |
| 20 | 98 lbs/in. | — | 108 lbs/in. | — |
| 21 | 105 lbs/in. | — | 166 lbs/in. | — |

Specimens of the sheets were tested for cold flexibility by cooling the specimens, after exposure to various pretreatments, to −15° F., and then bending them over a 3/8 inch mandrel. The results are reported in the table below:

| | Cold Flexibility (number failed/total tested) | | | |
|---|---|---|---|---|
| Example | Room Temp. | Water Immersion (2 wks) | 158° F. (2 wks.) | Weatherometer (160 hours) |
| 8 | 0/2 | 0/2 | 0/2 | 0/2 |
| 9 | 0/2 | 0/2 | 0/2 | 0/2 |
| 10 | 0/2 | 0/2 | 0/2 | 0/2 |
| 11 | 0/2 stress lines | 0/2 | 0/2 stress lines | 0/2 stress lines |
| 12 | 0/2 | 0/2 | 0/2 | 0/2 |
| 13 | 0/2 | 0/2 | 0/2 | 0/2 |
| 14 | 0/2 | 0/2 | 0/2 | 0/2 |
| 15 | 0/2 | 0/2 | 0/2 | 0/2 |
| 16 | 0/2 | 0/2 | 0/2 | 0/2 |
| 17 | 0/2 stress lines | 0/2 | 0/2 stress lines | 0/2 stress lines |
| 18 | 0/2 stress lines | 0/2 | 0/2 stress lines | 0/2 stress lines |
| 19 | 0/2 | 0/2 | 0/2 | 0/2 |
| 20 | 0/2 | 0/2 | 0/2 | — |
| 21 | 0/2 | 0/2 | 0/2 | — |

These data show that the sheet material produced in accordance with the present invention will satisfactorily withstand the atmospheric conditions to which the sheeting would be exposed as a waterproofing membrane in a roofing application.

Materials which have been found to be unsatisfactory adjuvants for polyvinyl butyral include polybutene, chlorinated paraffin wax, tall oil, tall oil pitch, atactic polypropylene, coumarone resins and polystyrene. These materials would not mix homogeneously with polyvinyl butyral and hence suitable sheeting could not be formed.

Having thus described our invention, we claim:

1. A self-supporting sheet material suitable for use as a waterproofing membrane in roofing and other structural applications, said sheet having a thickness within the range of about 20 to about 90 mils and being composed of from about 15 wt.% to about 80 wt.% of an ingredient selected from the group consisting of resin acids and resin acid derivatives, and from about 85 wt.% to about 20 wt.% of a plasticized polyvinyl butyral resin.

2. A sheet material defined in claim 1 wherein said ingredient is pine tar.

3. The sheet material defined in claim 1 wherein said ingredient is a glycerol ester of hydrogenated resin.

4. The sheet material defined in claim 1 wherein said ingredient is hydorgenated methyl rosinate.

5. The sheet material defined in claim 1 further including from about 2 wt.% to about 8 wt.% of at least one fatty acid.

6. The sheet material defined in claim 1 having a thickness of about 40 mils.

* * * * *